US009921320B2

(12) United States Patent
Kawata et al.

(10) Patent No.: US 9,921,320 B2
(45) Date of Patent: Mar. 20, 2018

(54) RADIATION DETECTING APPARATUS, INPUT-OUTPUT CALIBRATION METHOD, AND COMPUTER PROGRAM PRODUCT

(71) Applicant: Kabushiki Kaisha Toshiba, Minato-ku (JP)

(72) Inventors: Go Kawata, Kawasaki (JP); Shunsuke Kimura, Kawasaki (JP); Yasuharu Hosono, Kawasaki (JP); Rei Hasegawa, Yokohama (JP); Toshiyuki Ono, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 90 days.

(21) Appl. No.: 14/927,853

(22) Filed: Oct. 30, 2015

(65) Prior Publication Data

US 2016/0282487 A1 Sep. 29, 2016

(30) Foreign Application Priority Data

Mar. 23, 2015 (JP) ................................. 2015-060097

(51) Int. Cl.
*G01D 18/00* (2006.01)
*G01T 7/00* (2006.01)
(Continued)

(52) U.S. Cl.
CPC .............. *G01T 7/005* (2013.01); *G01T 1/208* (2013.01); *G01T 1/2018* (2013.01)

(58) Field of Classification Search
CPC ....... G01T 1/242; G01T 1/2018; G01T 1/208; G01T 1/2002; G01T 1/17; G01T 1/171;
(Continued)

(56) References Cited

U.S. PATENT DOCUMENTS 5,023,449 A * 6/1991 Holenka .................... G01T 1/40
250/252.1
5,703,369 A * 12/1997 Mori ...................... G01T 1/1611
250/363.03
(Continued)

FOREIGN PATENT DOCUMENTS

JP 3-150488 6/1991
JP 2003-57346 2/2003
(Continued)

*Primary Examiner* — Taeho Jo
(74) *Attorney, Agent, or Firm* — Oblon, McClelland, Maier & Neustadt, L.L.P.

(57) ABSTRACT

According to an embodiment, an apparatus includes a first detector, a second detector, and a controller. The first detector is configured to detect first radiation at a first frequency within a first time by at least a first radiation detecting element and a second radiation detecting element that are positioned near to each other, and output a first signal. The second detector is configured to detect second radiation at a second frequency less than the first frequency within a second time by at least the first radiation detecting element and the second radiation detecting element, and output a second signal. The controller is configured to generate a third signal representing a difference between the first signal and the second signal, and calculate energy using the third signal.

4 Claims, 10 Drawing Sheets

(51) Int. Cl.
*G01T 1/20* (2006.01)
*G01T 1/208* (2006.01)

(58) Field of Classification Search
CPC ......... G01T 1/18; G01T 1/248; G01T 1/2985; G01T 7/005
USPC .................................................. 250/252.1
See application file for complete search history.

(56) References Cited

U.S. PATENT DOCUMENTS

| | | | | |
|---|---|---|---|---|
| 6,148,057 A * | 11/2000 | Urchuk | ............... | A61B 6/583 378/18 |
| 6,931,098 B2 * | 8/2005 | Kump | ............... | A61B 6/405 348/E5.081 |
| 7,260,171 B1 * | 8/2007 | Arenson | ............... | A61B 6/032 378/16 |
| 7,633,057 B2 | 12/2009 | Cooke et al. | | |
| 7,872,221 B2 * | 1/2011 | Blevis | ............... | G01T 1/249 250/252.1 |
| 8,585,286 B2 | 11/2013 | Livne et al. | | |
| 9,134,440 B2 * | 9/2015 | Sanuki | ............... | G01T 1/2914 |
| 2003/0075685 A1 * | 4/2003 | Yamakawa | ............... | G01T 1/2928 250/370.11 |
| 2007/0228267 A1 * | 10/2007 | Yokoi | ............... | G01T 1/1644 250/252.1 |
| 2008/0260094 A1 * | 10/2008 | Carmi | ............... | A61B 6/032 378/19 |
| 2009/0016482 A1 * | 1/2009 | Shechter | ............... | A61B 6/032 378/4 |
| 2009/0194703 A1 * | 8/2009 | Eversmann | ............... | G01T 1/17 250/395 |
| 2009/0309031 A1 * | 12/2009 | Ohtani | ............... | G01T 1/2985 250/363.03 |
| 2010/0027738 A1 * | 2/2010 | Carmi | ............... | G01T 1/17 378/19 |
| 2010/0200763 A1 * | 8/2010 | Thon | ............... | H01J 43/18 250/370.11 |
| 2010/0215230 A1 * | 8/2010 | Bornefalk | ............... | G06T 11/005 382/128 |
| 2011/0012014 A1 * | 1/2011 | Livne | ............... | A61B 6/032 250/252.1 |
| 2012/0074304 A1 * | 3/2012 | Glasser | ............... | H04N 5/3651 250/252.1 |
| 2012/0087463 A1 * | 4/2012 | Greenberg | ............... | G01T 1/29 378/5 |
| 2013/0044248 A1 * | 2/2013 | Tumer | ............... | H03F 3/087 348/302 |
| 2013/0110438 A1 * | 5/2013 | Rinkel | ............... | G01N 23/087 702/85 |
| 2014/0105370 A1 * | 4/2014 | Yamakawa | ............... | A61B 6/025 378/207 |
| 2014/0284488 A1 * | 9/2014 | Sanuki | ............... | G01T 1/2914 250/370.09 |
| 2014/0306116 A1 * | 10/2014 | Roessl | ............... | G01T 1/2008 250/362 |
| 2015/0003591 A1 * | 1/2015 | Schweizer | ............... | A61B 6/481 378/62 |
| 2015/0063527 A1 * | 3/2015 | Daerr | ............... | G01T 1/171 378/5 |
| 2015/0083913 A1 * | 3/2015 | Kinugasa | ............... | G01T 1/171 250/336.1 |
| 2015/0117594 A1 * | 4/2015 | Pavlovich | ............... | A61B 6/032 378/5 |
| 2015/0125032 A1 * | 5/2015 | Yamanaka | ............... | H04N 5/232 382/103 |
| 2015/0226865 A1 * | 8/2015 | Nishihara | ............... | H01L 27/14609 250/366 |
| 2016/0095560 A1 * | 4/2016 | Nakai | ............... | A61B 6/03 378/5 |
| 2016/0113603 A1 * | 4/2016 | Schirra | ............... | A61B 6/032 250/252.1 |
| 2016/0216381 A1 * | 7/2016 | Nishihara | ............... | G01T 1/1644 |
| 2016/0241795 A1 * | 8/2016 | Nishihara | ............... | H04N 5/32 |
| 2016/0374629 A1 * | 12/2016 | Kawata | ............... | A61B 6/032 378/19 |

FOREIGN PATENT DOCUMENTS

| | | |
|---|---|---|
| JP | 2003-57354 | 2/2003 |
| JP | 2011-85479 | 4/2011 |
| JP | 2011-516852 | 5/2011 |
| JP | 2014-161590 | 9/2014 |
| JP | 2015-184116 A | 10/2015 |

* cited by examiner

|  | Kα (keV) | Kβ (keV) |
|---|---|---|
| Lu+BASED (e.g., LYSO, LSO) | 54.07 | 52.97 |
| Gd+BASED (e.g., GSO, GAGG) | 43.00 | 42.31 |
| Y+BASED (e.g., YAG, YAP) | 14.96 | 14.88 |

RADIATION DETECTING APPARATUS, INPUT-OUTPUT CALIBRATION METHOD, AND COMPUTER PROGRAM PRODUCT

CROSS-REFERENCE TO RELATED APPLICATION

This application is based upon and claims the benefit of priority from Japanese Patent Application No. 2015-060097, filed on Mar. 23, 2015; the entire contents of which are incorporated herein by reference.

FIELD

Embodiments described herein relate generally to a radiation detecting apparatus, an input-output calibration method, and a computer program product.

BACKGROUND

Known today are photon-counting computed tomography (CT) devices using a photon-counting radiation detector (hereinafter, simply referred to as a detector). Unlike integrating detectors, photon-counting detectors output signals from which each of the X-ray photons having passed through a subject can be counted. In other words, a photon-counting detector outputs a pulse signal representative of a radioactive ray being incident on the detector, and with a waveform having a pulse height proportional to the radioactive energy. The detector can therefore estimate the radioactive energy incident on the detector by analyzing the pulse waveform. A photon counting CT device is therefore capable of reconstructing an X-ray CT image with a high signal-to-noise (SN) ratio.

The signals output from the photon-counting detector can also be used in measuring (separating) the energies of the X-ray photons. The photon counting CT device is therefore capable of visualizing a plurality of separate energy components from a piece of projection data collected from X-ray radiation at one tube voltage.

Required to enable the detector to distinguish subject materials from one another by measuring the energies of the X-ray photons having passed through the materials is calibration of the detector in a relation between detector outputs and energies of the fluorescent X-rays (incident energies) that are incident on the detector. In other words, when the detector is what is called an indirect conversion detector, detectors have variations in the characteristics of the silicon photomultiplier (SiPM) device (such as the multiplication factor and the operating temperature), and variations in the detection efficiency of scintillation light (variations in the detector geometric structure), and therefore, calibration of the detector outputs with respect to incident energies is required. The indirect conversion detector is a detector that converts incident X-ray photons into scintillation photons using a scintillator, amplifies the scintillation photons with the SiPM, and outputs the result.

In the energy calibration of photon-counting detectors, a standard source such as checking source or a radioisotope (RI) is often used. However, a checking source or an RI has limited radioactivity. When a detector is calibrated by placing a standard source with a radioactivity of several maga-becquerels to giga-becquerels and requiring strict management at a position approximately 1 meter away from the detector, a dose of radioactive rays being incident on each detecting element, which has a size of 1 millimeter by 1 millimeter, for example, is reduced prominently to a level of several becquerels to several-thousands becquerels. It is therefore infeasible to use a standard source in the energy calibration of the detector with several tens of thousands detecting elements.

A known approach for addressing issue is to obtain the K-absorption edge of a subject by positioning a subject for calibration between an X-ray tube and a detector, differentiating the energy profile of the linear attenuation coefficients of the subject, and estimating the local maximum.

With this approach in which the K-absorption edge of the subject is obtained by estimating the local maximum, however, a signal giving the local maximum in the differential waveform of linear attenuation coefficients, which is at the inflection point of the curve representing the K-absorption edge of the subject, shifts depending on the detector response. An indirect conversion detector using a scintillator, in particular, has a quite low energy resolution, that is, approximately 20 percent or so (estimated with 122 kilo-electron volts), so the detection of the exact K-absorption edge is quite difficult.

Furthermore, a cerium-doped lutetium yttrium orthosilicate (LYSO) crystal or LSO ($Lu_2SiO_5$) crystal, which includes lutetium (Lu) as a constituent element of the scintillator provided to the detector, include unstable Lu isotopes. When these unstable isotopes stabilize, three gamma rays (at 88 kilo-electron volts, 202 kilo-electron volts, and 307 kilo-electron volts) are emitted, while cascade transition takes place. An energy calibration method that measures the background radiation of Lu elements using this phenomenon is also known.

This approach, however, may require a long time and consume an enormous amount of power to calibrate, because Lu has low radioactivity. Furthermore, the calibration needs to be carried out during the time in which the device not in use, e.g., during night time. Furthermore, because radiation detecting apparatuses require energy calibration in a range from 0 kilo-electron volts to 150 kilo-electron volts, the precision of the energy calibration is reduced merely with three gamma rays.

DETAILED DESCRIPTION

According to an embodiment, an apparatus includes a first detector, a second detector, and a controller. The first detector is configured to detect first radiation at a first frequency within a first time by at least a first radiation detecting element and a second radiation detecting element that are positioned near to each other, and output a first signal. The second detector is configured to detect second radiation at a second frequency less than the first frequency within a second time by at least the first radiation detecting element and the second radiation detecting element, and output a second signal. The controller is configured to generate a third signal representing a difference between the first signal and the second signal, and calculate energy using the third signal.

Exemplary embodiments of a photon counting CT device including an indirect conversion radiation detector, which converts scintillator light corresponding to X-ray photons into electrical charge, will now be explained in detail with reference to some drawings.

First Embodiment

Overview

Figure 1:
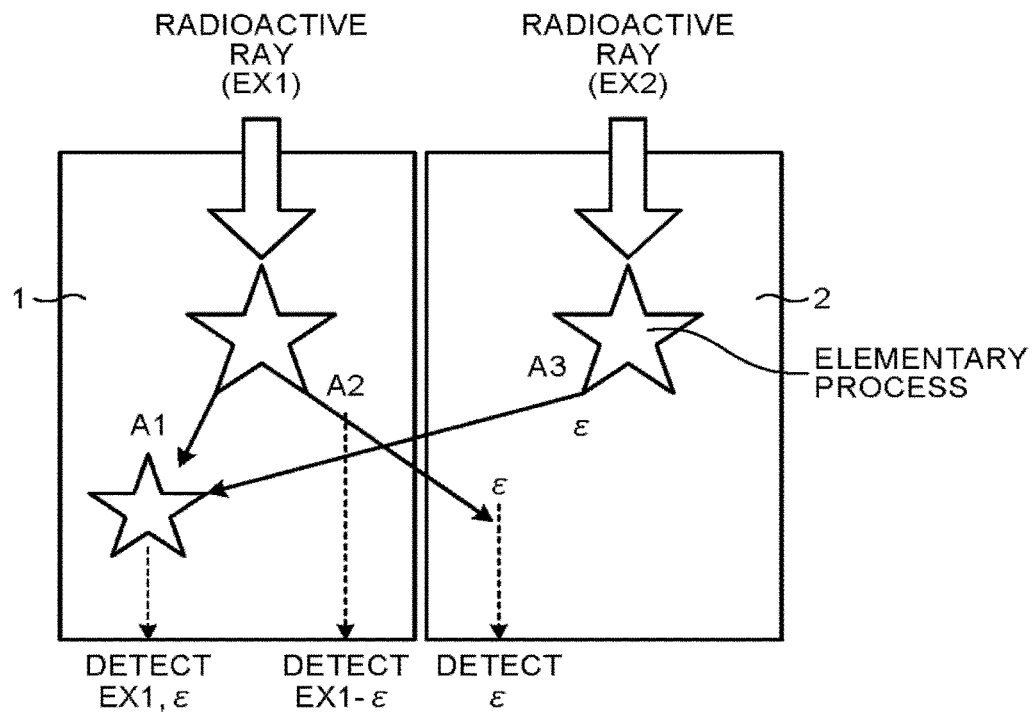
FIG. 1 is a schematic of a radioactive energy detecting process taking place inside of a radiation detector on which radioactive rays are incident.

To begin with, a photon counting CT device according to a first embodiment will now be generally explained. FIG. 1 illustrates a radioactive energy detecting process taking place inside of the radiation detector (hereinafter, simply referred to as a detector) on which radioactive rays are incident. In FIG. 1, when the radioactive ray with energy EX1 becomes incident on a scintillator 1, the radioactive ray goes through a physical process, which will be explained later in an elementary process with reference to FIG. 2, in the scintillator 1, and the radioactive energy is converted into fluorescent X-ray.

Figure 2:
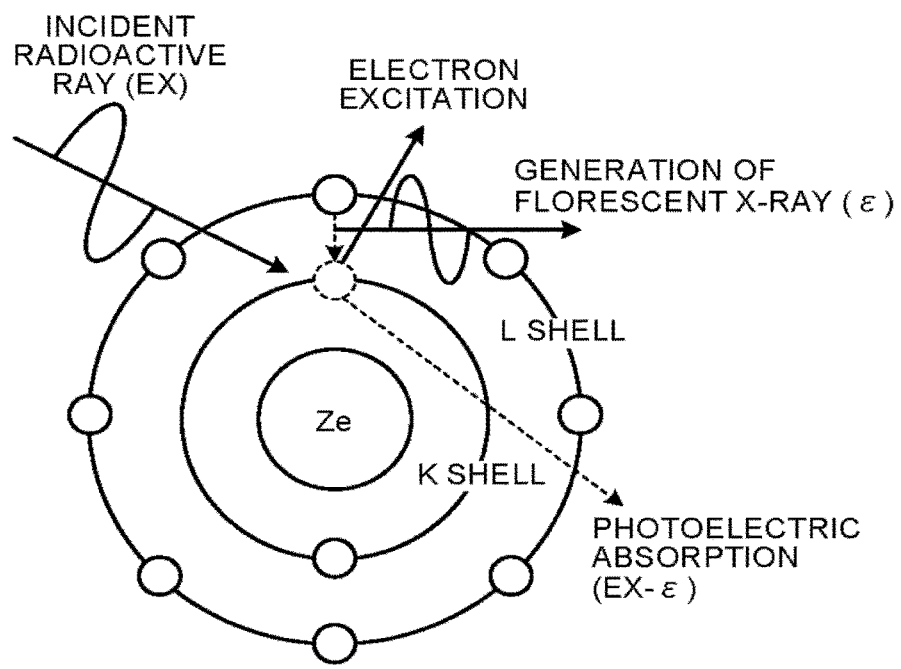
FIG. 2 is a schematic for explaining an elementary process in which radioactive energy is converted into fluorescent X-ray energy.

The elementary process will now be explained with reference to FIG. 2. The radioactive ray with energy EX and being incident on the scintillator interacts with a constituent element (with an atomic weight of Z) of the scintillator. When being incident on the scintillator is a radioactive ray with energy equal to or higher than the core-electron binding energy of the scintillator constituent element with an atomic weight of Z, the radioactive ray excites the core electrons of the scintillator constituent element. As a vacancy in the K shell is filled with an electron from the L shell, a fluorescent X-ray (energy $\epsilon$) is emitted.

In this manner, a fluorescent X-ray is emitted as a radioactive ray becomes incident on the scintillator, but the fluorescent X-ray may escape to the external from the scintillator 1, as illustrated in FIG. 1. When an adjacent scintillator 2 absorbs the fluorescent X-ray having escaped to the external, the adjacent detector detects a radioactive ray with energy $\epsilon$, although no radioactive ray is incident on the detector surface of the scintillator 2. For the reason above, when a radioactive ray with energy equal to or higher than the K-shell electron energy becomes incident on the detector, the scintillator 1 detects a radioactive ray with energy EX1 and a radioactive ray with energy EX1-$\epsilon$, and the scintillator 2 detects the radioactive ray with the energy $\epsilon$.

Figures 3, 4:
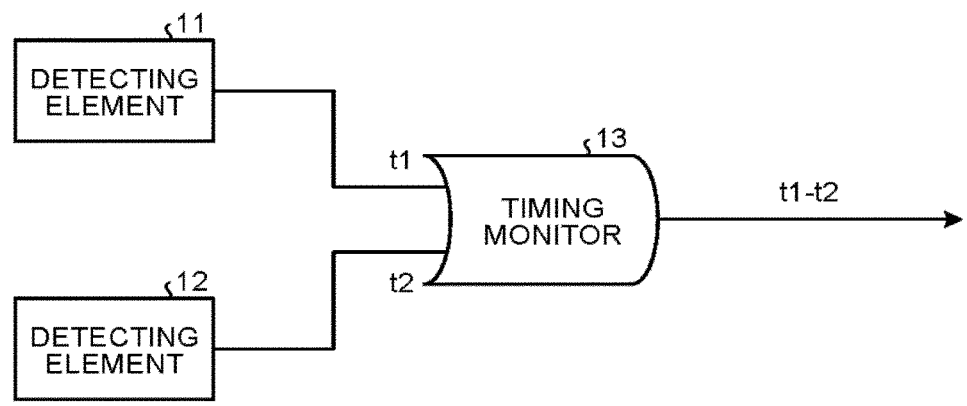
FIG. 3 is a schematic listing radiation absorbing elements generally used in commonly used scintillators that are capable of operating at a high speed, and fluorescent X-ray energies characterizing each of the radiation absorbing elements.
FIG. 4 is a schematic illustrating the concept of an operation of the photon counting CT device according to an embodiment.

At this time, the detection events of the energy EX1-$\epsilon$ and the energy $\epsilon$ take place simultaneously. Therefore, by evaluating the concurrency between the scintillators 1 and 2, the detecting elements corresponding to the scintillator 1 and the scintillators 2 can detect the energy of the fluorescent X-ray. FIG. 3 provides radiation absorbing elements generally used in commonly used scintillators that are capable of operating at a high speed, and fluorescent X-ray energies characterizing each of the radiation absorbing elements. As illustrated in FIG. 3, a scintillator that is based on Lu+ such as LYSO or LSO emits a K$\alpha$ fluorescent X-ray at 54.07 kilo-electron volts, and a K$\beta$ fluorescent X-ray at 52.97 kilo-electron volts. A scintillator that is based on Gd+ such GSO or GAGG emits a K$\alpha$ fluorescent X-ray at 43.00 kilo-electron volts, and a K$\beta$ fluorescent X-ray at 42.31 kilo-electron volts. A scintillator that is based on Y+ such as YAG or YAP emits a K$\alpha$ fluorescent X-ray at 14.96 kilo-electron volts, and a K$\beta$ fluorescent X-ray at 14.88 kilo-electron volts.

In the photon counting CT device according to the first embodiment, denoting the time at which the adjacent detecting elements 11 and 12 outputs the output signals as t1 and t2, respectively, as illustrated in FIG. 4, the timing monitor 13 measures the time difference (t1−t2) between the two.

Figure 5:
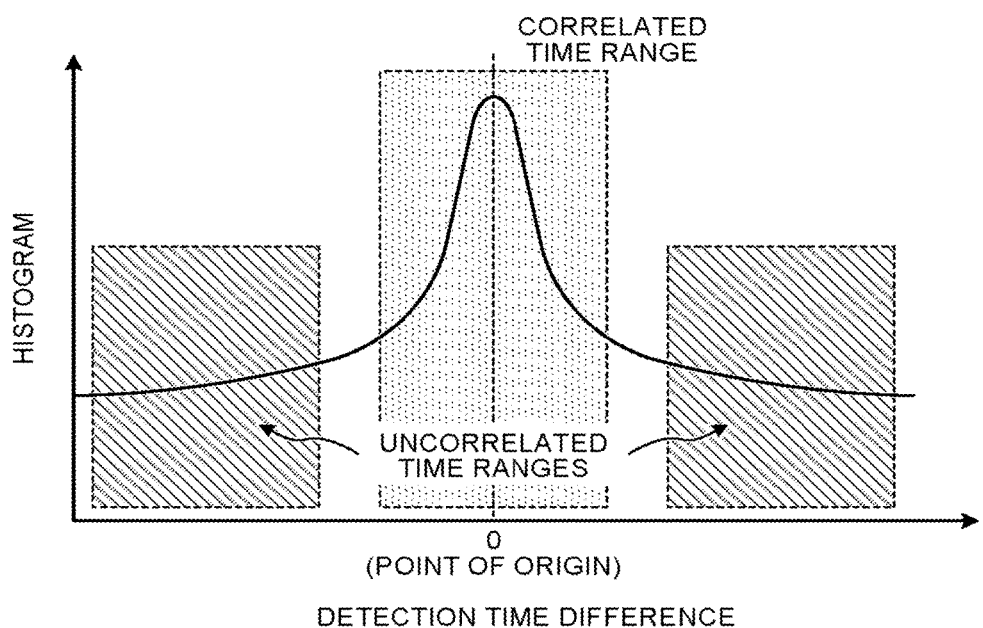
FIG. 5 is a histogram at which the X-ray photons are detected in a correlated time and an uncorrelated time.

FIG. 5 is a graph in which the detection time difference (t1–t2) is plotted to the horizontal axis, and the frequency of the detections is plotted to the vertical axis. As illustrated in FIG. 5, the graph of the detection frequency distribution with respect to the detection time difference (t1–t2) delineates a curve in which the detection frequency surges from a range in which the time difference is large in the negative direction toward a range in which the detection time difference is zero (point of origin), and drops from the range in which the detection time difference is zero (point of origin) toward a range in which the detection time difference is large in the positive direction. In other words, the graph of the detection frequency distribution with respect to the detection time difference (t1–t2) delineates a curve in which the peak detection frequency, which is the frequency at which concurrent signals are detected, is at zero detection time difference (point of origin). Hereinafter, a predetermined temporal range with its center at the zero detection time difference (point of origin), at which the frequency distribution is at its peak is referred to as a "correlated time (correlated time range)", and the temporal ranges corresponding to the shoulders on both sides of the "correlated time" (the temporal ranges in which the detection frequency delineates flat parts of the graph) are referred to as "uncorrelated time (uncorrelated time ranges)".

When measured are events with a sufficiently low counting rate (<10 kcps/detecting element), uncorrelated events will be measured at a very low frequency. By contrast, when events are measured at a high counting rate (>100 kcps/detecting element), uncorrelated events will be measured at a high frequency. When the counting rate is high, events detected within the correlated time range may include contingent events that are measured simultaneously, in addition to the events that are measured truly from the fluorescent X-ray emissions. In other words, the components in the correlated time near the point of origin (zero detection time difference) in FIG. 5 also include detection events belonging to the uncorrelated time represented as hatched in FIG. 5.

Figure 6:
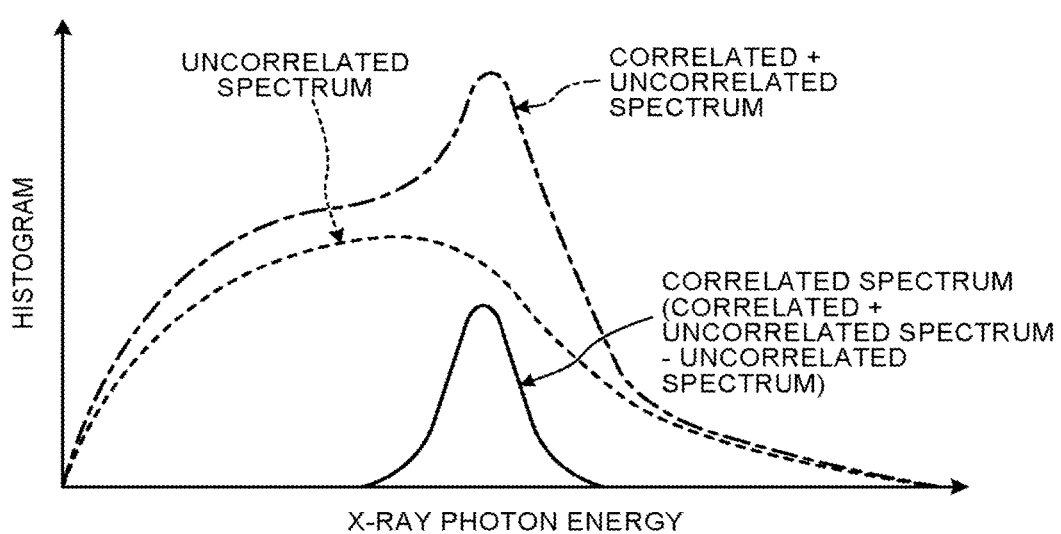
FIG. 6 a schematic for explaining an operation of building a correlated spectrum.

FIG. 6 provides graphs of a correlated+uncorrelated spectrum, an uncorrelated spectrum, and a difference spectrum between the two, normalized by the measurement time. The graph plotted in a dot-and-dash line in FIG. 6 is the graph of the correlated+uncorrelated spectrum. The graph plotted in a dotted line FIG. 6 is the graph of the uncorrelated spectrum. The graph plotted in a solid line in FIG. 6 is a spectrum graph of the difference between the two. As may be clear from FIG. 6, by taking the difference between the correlated+uncorrelated spectrum (the graph in the dot-and-dash line) and the uncorrelated spectrum (the graph in the dotted line), the fluorescent X-ray detection spectrum (the graph in the solid line), corresponding only to the correlated time, can be acquired.

Figure 7:
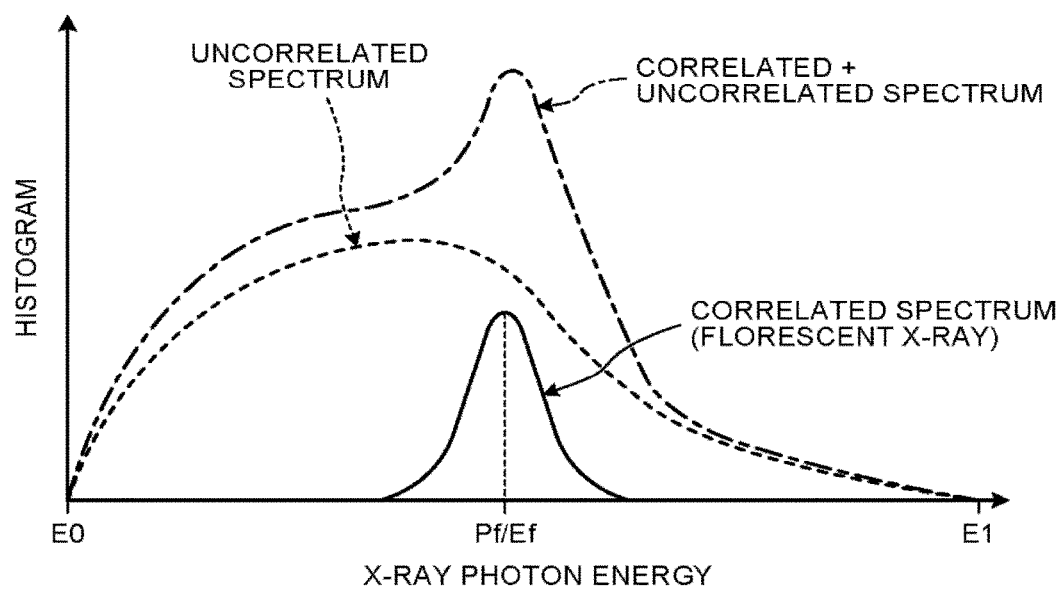
FIG. 7 is a schematic for explaining an energy calibration operation performed in the photon counting CT device according to the embodiment.
Figure 8:
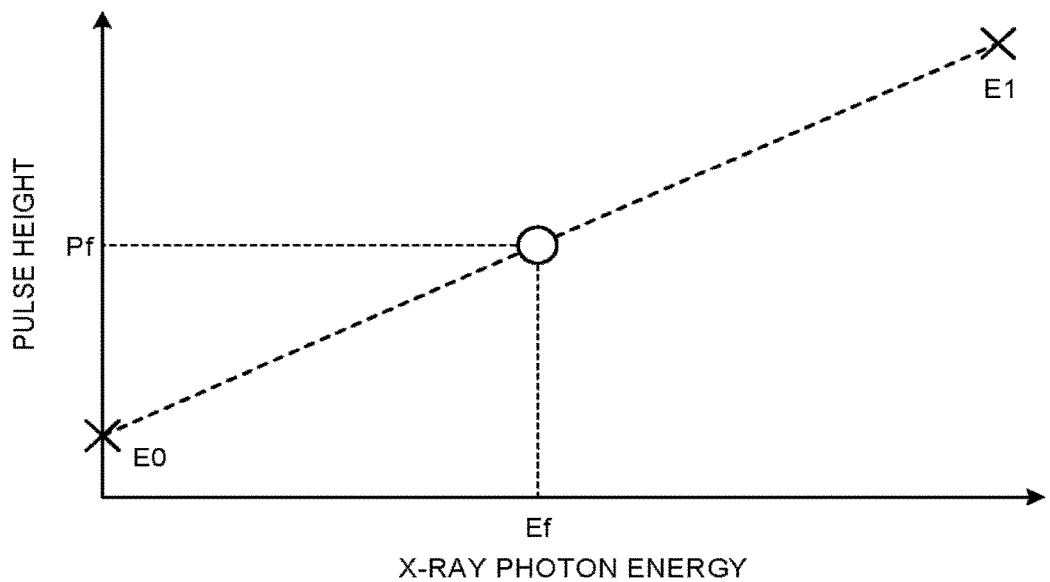
FIG. 8 is a schematic illustrating a relation between the point of origin for energy, the upper boundary of the energy, and a peak position of fluorescent X-ray detections.

FIGS. 7 and 8 are schematics for explaining the concept of detector energy calibration using the fluorescent X-ray detection spectrum corresponding only to the correlated time acquired in the manner described above. The energy at the point of origin is set at a zero level E0 of the detector output, and the upper boundary of the energy is set at the tube voltage E1 (accelerating voltage) of the X-ray tube. The energy position at which detections of the fluorescent X-ray Ef reach its peak is denoted as Pf. FIG. 8 illustrates the relation between these energies. Because the position acquired from the fluorescent X-ray energy detections can be used as an estimation of the position E1 of the energy upper boundary, where the estimation error is relatively large, highly precise energy calibration can be achieved. The signal position E1 representing the upper boundary of the energy can be estimated using a technique disclosed in Japanese Patent Application Laid-open No. 2014-161590, for example.

Hardware Configuration

Figure 9:
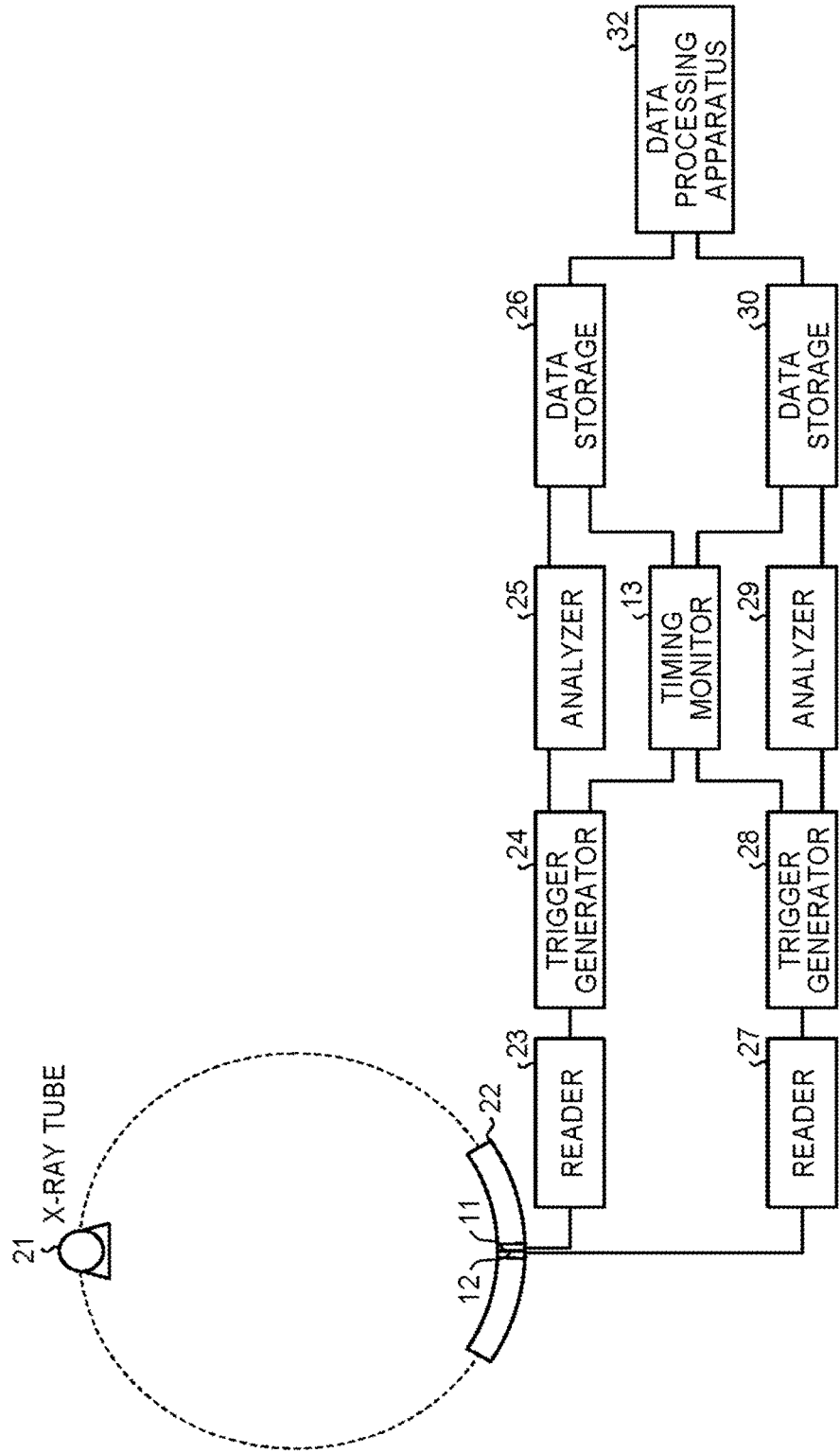
FIG. 9 is a schematic of a hardware configuration of relevant parts of the photon counting CT device according to a first embodiment.

FIG. 9 is a hardware configuration of relevant parts of the photon counting CT device according to the first embodiment. The photon counting CT device reconstructs X-ray CT image data with a high SN ratio by measuring the photons (X-ray photons) originating from the X-rays passed through a subject using a photon-counting detector (22). The photons have different energy levels. The photon counting CT device acquires information of the energy components of the X-rays by measuring the energies of the respective photons. The photon counting CT device outputs an image representing a plurality of energy components using the projection data collected by driving the X-ray tube (21) with one tube voltage.

In other words, the photon counting CT device includes an X-ray tube 21, a detector 22, a reader 23, a trigger generator 24, an analyzer 25, a data storage 26, a reader 27, a trigger generator 28, an analyzer 29, a data storage 30, a timing monitor 13, and a data processing apparatus 32, as illustrated in FIG. 9. The X-ray tube 21 and the detector 22 are mounted facing each other on a rotating frame, so that a subject is interposed between the X-ray tube 21 and the detector 22. The X-ray tube 21 emits X-rays, and the detector 22 counts X-ray photons, while the X-ray tube 21 and the detector 22 are rotated at a high speed around the subject.

Figure 10:
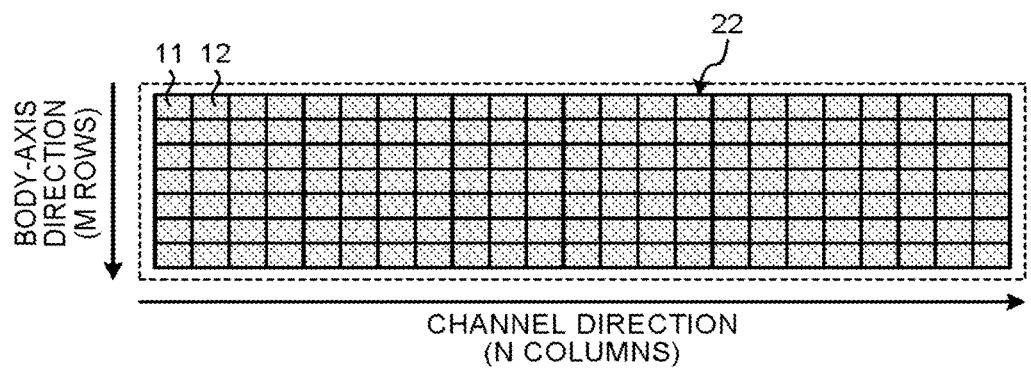
FIG. 10 is a schematic illustrating a detector provided to a photon counting CT device according to the first embodiment.

FIG. 10 illustrates an example of the detector 22. The detector 22 is configured as a plane detector including an array of a plurality of detecting elements, such as the first detecting element 11 and the second detecting element 12, each implemented as an optical sensor such as a scintillator and an avalanche photodiode. The detecting elements are arranged in N columns in the channel direction, and arranged in M rows in the subject body axis direction. Each of the detecting elements outputs a 1-pulse electrical signal when an X-ray photon becomes incident on the corresponding detecting element. By separating the pulses output from each of the detecting elements, the number of X-ray photons being incident on the corresponding detecting element can be counted. The energy level of the counted X-ray photon can be measured by performing operation based on the pulse height.

The units from the reader 23 to the data storage 26 make up a signal processing system for processing the fluorescent X-ray signals detected by the first detecting element 11. The units from the reader 27 to the data storage 30 make up a signal processing system for processing the fluorescent X-ray signals detected by the second detecting element 12. The photon counting CT device according to the first embodiment includes the signal processing systems in the number equal to the number of detecting elements. The timing monitor 13 generates a correlation detection window indicating the time at which a correlated component is detected, and an uncorrelation detection window indicating the time at which an uncorrelated component is detected, using the fluorescent X-ray signals output from the first detecting element 11 and from the second detecting element positioned adjacent to the first detecting element 11.

The data storage 26 stores the pulse height of the fluorescent X-ray signal detected in the correlation detection window, and the pulse height of the fluorescent X-ray signal detected in the uncorrelation detection window, among those detected by the first detecting element 11 during the time corresponding to the correlation sequence, which takes 1 second or 2 seconds per sequence, for example. In the same manner, the data storage 30 stores the pulse height of the fluorescent X-ray signal detected in the correlation detection window, and the pulse height of the fluorescent X-ray signal detected in the uncorrelation detection window, among those detected by the second detecting element 12 within the time corresponding to the correlation sequence.

Figure 11:
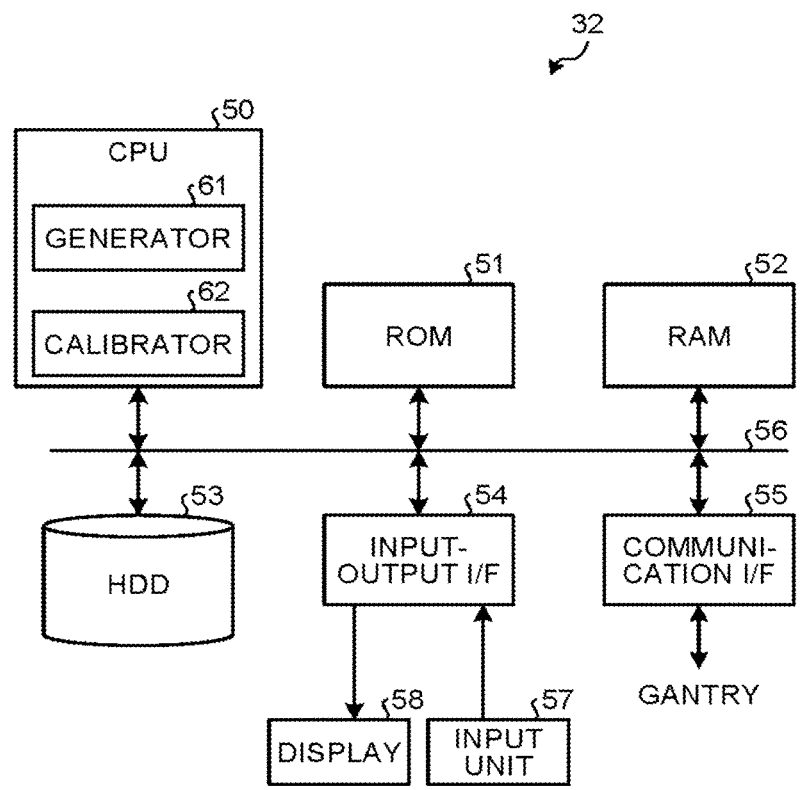
FIG. 11 is a block diagram of a data processing apparatus provided to the photon counting CT device according to the first embodiment.

The data processing apparatus 32 has a hardware configuration similar to that of a general-purpose personal computer device, as illustrated in FIG. 11. In other words, the data processing apparatus 32 includes a central processor (CPU) 50, a read-only memory (ROM) 51, a random access memory (RAM) 52, a hard disk drive (HDD) 53, an input-output interface (I/F) 54, and a communication I/F 55. An input unit 57 such as a keyboard device and a mouse device, and a display 58 are connected to the input-output I/F 54.

The CPU 50 to the communication I/F 55 are connected to one another via a bus line 56. The communication I/F 55 is connected to a gantry in which a subject is laid. The storage unit such as the ROM 51 or the HDD 53 stores therein an input-output calibration program for calibrating the outputs from the detector 22 and incident energies (for performing energy calibration). The CPU 50 in the data processing apparatus 32 controls operations of the respective units, e.g., controls reading by the readers 23 and 27, and controls generation of triggers by the trigger generators 24 and 28, following the input-output calibration program. The CPU 50 also functions as a generator 61 and a calibrator 62, following the input-output calibration program. The CPU 50 performs energy calibration by performing an operation of adding a weight to an energy bin (pulse height), in a spectrum of the detection time difference between the adjacent detecting elements. Such a weight is determined based on a ratio between the counts of the correlated time components having a high coincidence factor, and the counts of the uncorrelated time components having a low coincidence factor. Any one or both of the generator 61 and the calibrator 62 may be implemented as hardware.

Circuit Configuration of Each Signal Processing System

Figure 12:
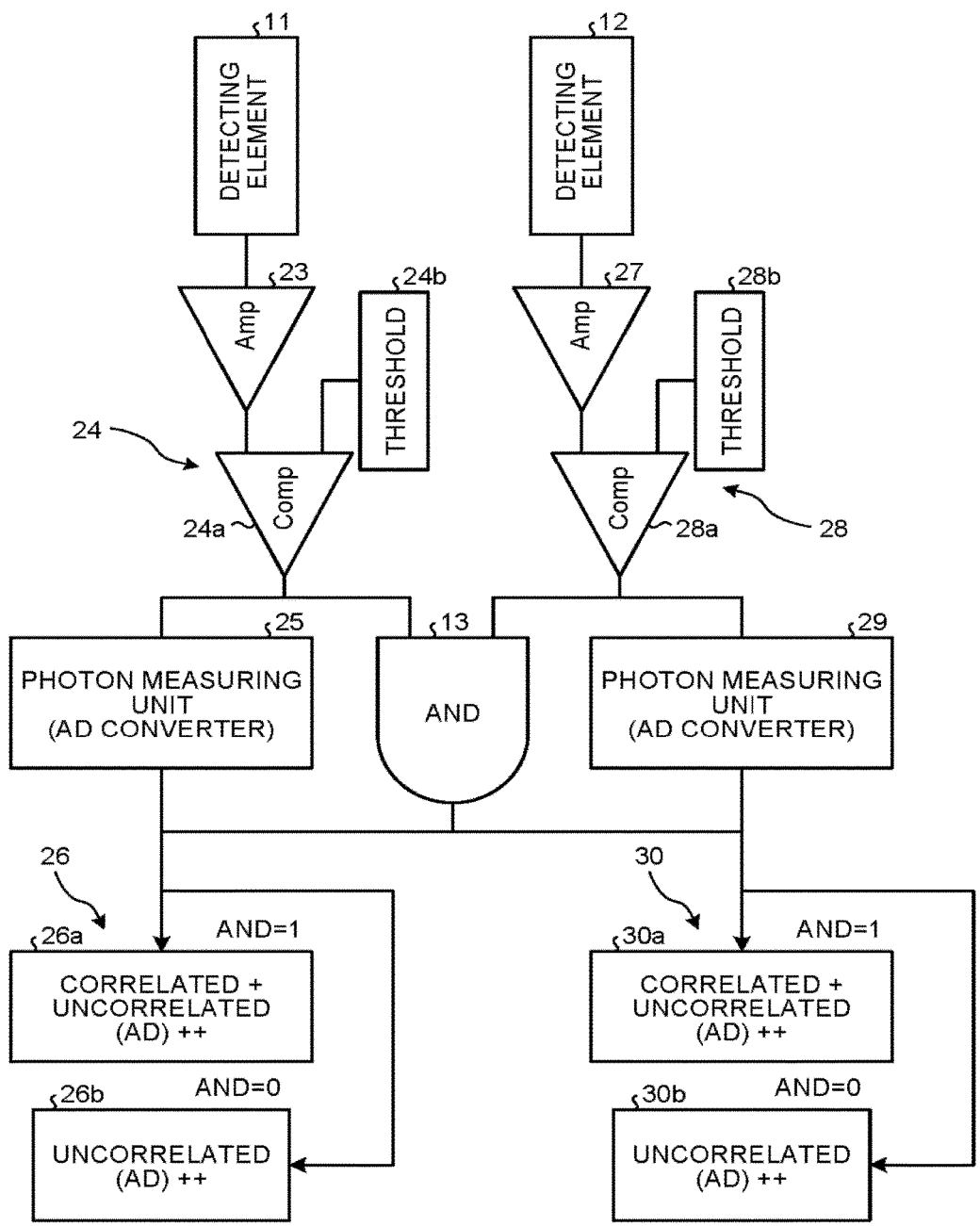
FIG. 12 is a circuit diagram of relevant parts of the photon counting CT device according to the first embodiment.

FIG. 12 is a circuit diagram of the signal processing system for processing the fluorescent X-ray signals detected by the first detecting element 11 or the second detecting element 12. The first detecting element 11 and the second detecting element 12 are examples of a first radiation detecting element and a second radiation detecting element, respectively. As illustrated in FIG. 12, the reader 23 and the reader 27 are both configured as an operational amplifier circuit. The trigger generator 24 includes a comparator 24a and a threshold generating circuit 24b. The comparator 24a in the trigger generator 24 compares a fluorescent X-ray signal received from the reader 23 with predetermined threshold, and outputs the comparison result. In the same manner, the trigger generator 28 includes a comparator 28a and a threshold generating circuit 28b, and the comparator 28a in the trigger generator 28 compares a fluorescent X-ray signal received from the reader 27 with a predetermined threshold, and outputs the comparison result.

The analyzer 25 and the analyzer 29 both serve as a photon measuring unit, and generates a pulse height corresponding to a photon count in the fluorescent X-ray signal. The timing monitor 13 includes one or more logical circuits such as an AND circuit. The timing monitor 13 generates a correlation detection window for detecting a correlated component, and an uncorrelation detection window for detecting an uncorrelated component, based on the comparison results output from the comparator 24a and the comparator 28a.

The data storage 26 includes a storage area 26a for storing therein the pulse height detected in the correlation detection window, and a storage area 26b for storing the pulse height detected in the uncorrelation detection window. The data storage 26 stores the pulse height of the fluorescent X-ray signal detected by the first detecting element 11 in the correlation detection window, which is indicated by the timing monitor 13, in the storage area 26a, among those detected in the time corresponding to the correlation sequence. The data storage 26 stores pulse height detected in the uncorrelation detection window, which is indicated by the timing monitor 13, in the storage area 26b.

In the same manner, the data storage 30 includes a storage area 30a for storing therein the pulse height detected in the correlation detection window, and a storage area 30b for storing therein the pulse height detected in the uncorrelation detection window. The data storage 30 stores the pulse height of the fluorescent X-ray signal detected by the second detecting element 12 in the correlation detection window, which is indicated by the timing monitor 13, in the storage area 30a, among those detected in the time corresponding to the correlation sequence. The data storage 30 stores the pulse height detected in the uncorrelation detection window, which is indicated by the timing monitor 13, in the storage area 30b.

The readers 23 and 27, the trigger generators 24 and 28, the analyzers 25 and 29, the storage area 26a in the data storage 26, and the storage area 30a in the data storage 30 are an example of a first detector. The readers 23 and 27, the trigger generators 24 and 28, the analyzers 25 and 29, the storage area 26b in the data storage 26, and the storage area 30b in the data storage 30 are an example of a second detector.

Operation of Each Signal Processing System

Figure 13A:
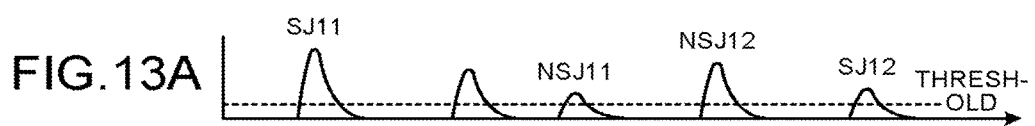
FIG. 13A is a schematic illustrating a signal waveform of a fluorescent X-ray signal from the first detecting element.

Operations of the signal processing systems for processing fluorescent X-ray signals detected by the first detecting element 11 and the second detecting element 12 having such configurations will now be explained in detail. FIG. 13A is a signal waveform representing a fluorescent X-ray signal detected by the first detecting element 11. The first waveform is a waveform corresponding to a correlated event SJ11. The third waveform is a waveform corresponding to an uncorrelated event NSJ11. The fourth waveform is a waveform corresponding to an uncorrelated event NSJ12. The fifth waveform is a waveform corresponding to a correlated event SJ12. The reader 23 reads a fluorescent X-ray signal such as that illustrated in FIG. 13A detected by first detecting element 11, and supplies the signal to the comparator 24a in the trigger generator 24.

Figure 13B:
FIG. 13B is a schematic of a trigger pulse generated from the fluorescent X-ray signal from the first detecting element.
Figure 13C:
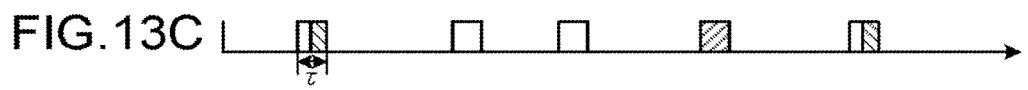
FIG. 13C is a schematic of a correlated detection window representing the time for which a correlated component of the fluorescent X-ray signal from the first detecting element is detected.

The threshold generating circuit 24b supplies a threshold at a predetermined level to the comparator 24a. The dotted line in FIG. 13A represents the threshold from the threshold generating circuit 24b. The comparator 24a compares the fluorescent X-ray signal, representing such an event, with the threshold. The comparator 24a then generates the trigger pulse illustrated in FIG. 13B at the timing at which a fluorescent X-ray signal equal to or higher than the threshold is detected, and supplies the trigger pulse to the timing monitor 13. The timing monitor 13 receiving the trigger pulse generates a correlation detection window representing the time at which a correlated component of the fluorescent X-ray signal is detected, as illustrated in FIG. 13C. The time length of the correlation detection window is denoted as "τ" in the example of FIG. 13C. As illustrated in FIG. 13C, every time a trigger pulse is received, the timing monitor 13 generates a correlation detection window in the length of τ.

Figure 13D:
FIG. 13D is a schematic of an uncorrelated detection window representing the time for which an uncorrelated component of the fluorescent X-ray signal from the first detecting element is detected.

Upon completion of the time for which the correlation detection window is generated, the timing monitor 13 generates an uncorrelation detection window for the time equivalent to 3τ, subsequently to the correlation detection window, as illustrated in FIG. 13D. In other words, the timing monitor 13 generates an uncorrelation detection window corresponding to the time 3τ, at the timing at which the time corresponding to the correlation detection window τ expires. The time of the correlation detection window and the time of the uncorrelation detection window can be set to any lengths. If the events across the entire time are to be evaluated, an enormous length of time is required. Because the photon counting CT device according to the first embodiment evaluates the events using the correlated time τ, and the uncorrelated time of 3τ, the evaluation can be completed in short time.

Figure 13E:
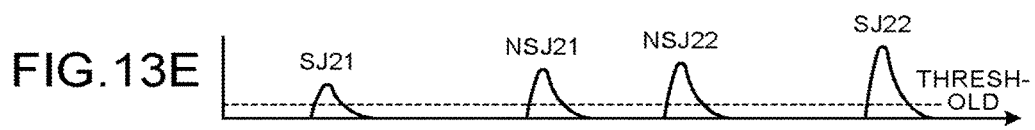
FIG. 13E is a schematic illustrating a signal waveform of a fluorescent X-ray signal from the second detecting element.

FIG. 13E is a signal waveform representing a fluorescent X-ray signal detected by the second detecting element 12. The first waveform is a waveform corresponding to a correlated event SJ21. The second waveform is a waveform corresponding to an uncorrelated event NSJ21. The third waveform is a waveform corresponding to an uncorrelated event NSJ22. The fourth waveform is a waveform corresponding to a correlated event SJ22. The reader 27 reads a fluorescent X-ray signal such as that illustrated in FIG. 13E detected by the second detecting element 12, and supplies the signal to the comparator 28a in the trigger generator 28.

Figure 13F:
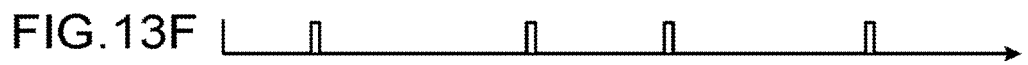
FIG. 13F is a schematic of a trigger pulse generated from the fluorescent X-ray signal from the second detecting element.
Figure 13G:
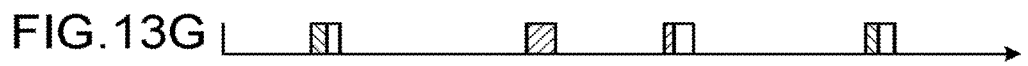
FIG. 13G is a schematic of a correlated detection window representing the time for which a correlated component of the fluorescent X-ray signal from the second detecting element is detected.

The threshold generating circuit 28b supplies a threshold at a predetermined level to the comparator 28a. The dotted line in FIG. 13E represents the threshold from the threshold generating circuit 28b. The comparator 28a compares the fluorescent X-ray signal, representing such an event, with the threshold. The comparator 28a then generates the trigger pulse illustrated in FIG. 13F at the timing at which a fluorescent X-ray signal equal to or higher than the threshold is detected, and supplies the trigger pulse to the timing monitor 13. The timing monitor 13 receiving the trigger pulse generates a correlation detection window representing the time for which a correlated component of the fluorescent X-ray signal is detected, as illustrated in FIG. 13G. The time of the correlation detection window is set to "τ", in the same manner as explained above. As illustrated in FIG. 13G, every time a trigger pulse is received, the timing monitor 13 generates a correlation detection window in the length of τ.

Figure 13H:
FIG. 13H is a schematic of an uncorrelated detection window representing the time for which an uncorrelated component of the fluorescent X-ray signal from the second detecting element is detected.

Upon completion of the time for which the correlation detection window is generated, the timing monitor 13 generates an uncorrelation detection window for the time equivalent to 3τ, subsequently to the correlation detection window, as illustrated in FIG. 13H. In other words, the timing monitor 13 generates an uncorrelation detection window corresponding to time "3τ" at the timing at which the time of the correlation detection window τ expires.

Figure 13I:
FIG. 13I is a schematic correlated time between the first detecting element and the second detecting element.

The timing monitor 13 then detects the time at which each of the correlation detection windows illustrated in FIG. 13C overlaps with that illustrated in FIG. 13G. FIG. 13I represents a signal at a high level (1) generated during the time in which a correlation detection window overlaps the other correlation detection window. The time in which the correlation detection windows overlap each other corresponds to the correlated time explained with reference to FIG. 5. The time hatched with downward diagonals toward the right in FIG. 13C represents the correlated time in the fluorescent X-ray signal detected by the first detecting element. The time hatched with downward diagonals toward the right in FIG. 13G represents the correlated time in the fluorescent X-ray signal detected by the second detecting element.

The data storage 26 stores photon measurement outputs received from the analyzer (photon measuring unit) 25, in the storage area 26a in the data storage 26 (accumulates the photon events), while receiving a supply of the signal at the high level (1) from the timing monitor 13. In this manner, photon events including correlated components and uncorrelated components corresponding to the correlated time are stored in the storage area 26a. In the same manner, the data storage 30 stores the photon measurement outputs from the analyzer (photon measuring unit) 29, in the storage area 30a in the data storage 30 (accumulates the photon events), while receiving a supply of the signal at a high level (1) from the timing monitor 13. In this manner, photon events including correlated components and uncorrelated components corresponding to the correlated time are stored in the storage area 30a.

Figure 13J:
FIG. 13J is a schematic of uncorrelated time between the first detecting element and the second detecting element.

The timing monitor 13 then detects the time in which the correlation detection windows illustrated in FIG. 13C, corresponding to the first detecting element 11, overlap with the uncorrelation detection windows illustrated in FIG. 13H, corresponding to the second detecting element 12. The timing monitor 13 then detects the time in which the uncorrelation detection windows illustrated in FIG. 13G, corresponding to the second detecting element 12, overlap with the uncorrelation detection window illustrated in FIG. 13D, corresponding to the first detecting element 11. The high-level signal illustrated in FIG. 13J indicates the time in which the correlation detection windows overlap with the uncorrelation detection windows. The time in which the correlation detection windows overlap with the uncorrelation detection windows corresponds to the uncorrelated time explained with reference to FIG. 5. The time hatched with downward diagonals toward the left in FIGS. 13D and 13H represents the uncorrelated time corresponding to the fluorescent X-ray signals detected by the first detecting element 11 and the second detecting element 12.

While the timing monitor 13 is detecting such uncorrelated time, the timing monitor 13 supplies a signal at a low level (0) to the data storage 26 and the data storage 30. While the signal at the low level (0) is being supplied from the timing monitor 13, the data storage 26 stores the photon measurement outputs from the analyzer (photon measuring unit) 25 in the storage area 26b in the data storage 26 (accumulates the photon events). In this manner, photon events including the uncorrelated components corresponding to the uncorrelated time are stored in the storage area 26b. In the same manner, the data storage 30 stores the photon measurement outputs from analyzer (photon measuring unit) 29 in the storage area 30b in the data storage 30 (accumulates the photon events) while the signal at the low level (0) is being supplied from the timing monitor 13. In this manner, photon events including the uncorrelated components corresponding to the uncorrelated time are stored in the storage area 30b.

There is no correlation detection window or uncorrelation detection window that overlaps with the correlation detection window (see FIG. 13C) corresponding to the fluorescent X-ray signal generated between the waveforms corresponding to the first correlated event NJ11 and the third uncorrelated event NSJ11 illustrated in FIG. 13A. Therefore, the photon measurement output corresponding to the fluorescent X-ray signal generated between the waveforms representing the first correlated event. NJ11 and the third uncorrelated event. NSJ11 is not accumulated in the data storage 26 or in the data storage 30. Because such a photon measurement output corresponding to a fluorescent X-ray signal with no overlapping window is not stored, the energy calibration process and the like can be performed at a high speed.

Energy Calibrating Operation

Figure 14:
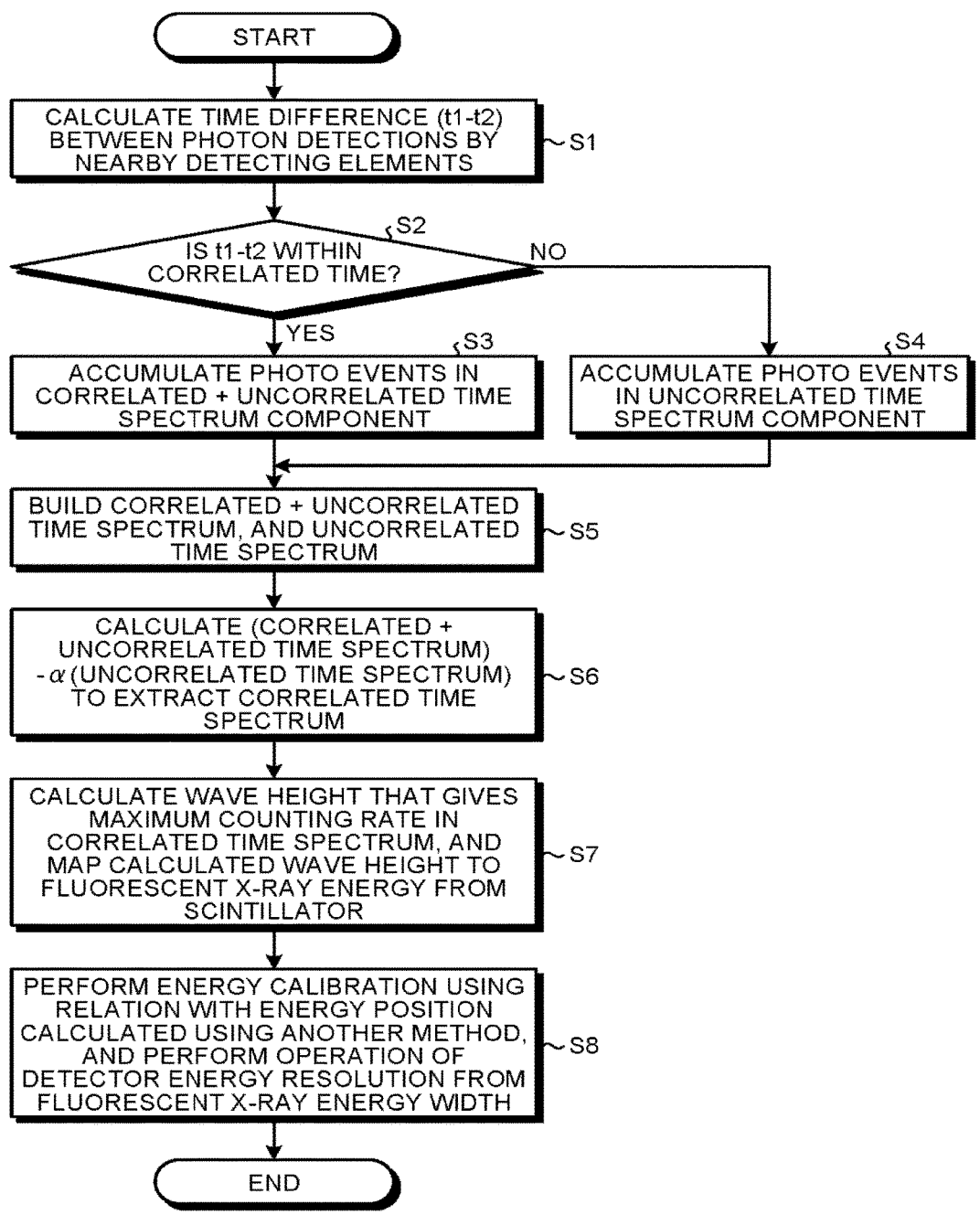
FIG. 14 is a flowchart illustrating a process up to when energy calibration is completed in the photon counting CT device according to the first embodiment.

The data processing apparatus 32 performs energy calibration by determining an energy calibration constant using the photon events stored in the data storage 26 and the data storage 30. FIG. 14 is a flowchart illustrating the process up to when the energy calibration is completed. Steps S1 to S4 in the flowchart of FIG. 14 correspond to the process in which the photon measurement outputs are stored in the data storage 26 and the data storage 30. To explain briefly, at Step S1, the timing monitor 13 calculates the detection time difference (t1−t2) between the detections of photons from the radioactive rays (fluorescent X-ray photons) detected by the respective two adjacent detecting elements, e.g., the first detecting element 11 and the second detecting element 12, as explained with reference to FIG. 4.

At Step S2, the timing monitor 13 determines whether the detection time difference (t1−t2) is within the correlated time illustrated in FIG. 5. If the detection time difference is determined to be within the correlated time (Yes at Step S2), the process is shifted to Step S3, and the photon measurement outputs from the analyzer (photon measuring unit) 25 are stored (the photon events are accumulated) in the storage area 26a in the data storage 26 and in the storage area 30a in the data storage 30 illustrated in FIG. 12. In this manner, photon events including correlated components and uncorrelated components corresponding to the correlated time are stored in the storage area 26a and the storage area 30a.

If the detection time difference (t1−t2) is determined not to be within the correlated time (No at Step S2), the process is shifted to Step S4, and the photon measurement outputs from the analyzer (photon measuring unit) 25 are stored (the photon events are accumulated) in the storage area 26b in the data storage 26 and the storage area 30b in the data storage 30 illustrated in FIG. 12. In this manner, photon events including the uncorrelated components corresponding to the uncorrelated time are stored in the storage area 26b and the storage area 30b.

Such a correlation sequence is repeated for a given length of time such as 1 second or 2 seconds. In this manner, photon events corresponding to the given time length are stored in the data storage 26 and the data storage 30.

At Step S5, the generator 61 constructs a correlated+uncorrelated spectrum corresponding to the graph in the dot-and-dash line in FIG. 6, and an uncorrelated spectrum corresponding to the graph in the dotted line in FIG. 6, from the photon events accumulated in the data storage 26 and the data storage 30. At Step S6, the generator 61 extracts a correlated spectrum, corresponding to the graph in the solid line in FIG. 6, by performing the operation of following Equation (1).

$$\text{Correlated spectrum}=(\text{correlated spectrum}+\text{uncorrelated spectrum})-\alpha(\text{uncorrelated spectrum}) \quad (1)$$

The value of "α" in Equation (1) is set to a value that can be normalized by the width (τ) of the correlation detection window and the width (3τ) of the uncorrelation detection window. In this manner, even when the detection conditions are not balanced, e.g., when the width of the correlation detection window is narrow (detection time is short) while the width of the uncorrelation detection window is wide (detection time is long), the operation can be performed using equivalent counts per unit, by setting the value α appropriately.

It can be assumed that the correlated spectrum is generated from the dominant part of the fluorescent X-ray energies. Therefore, at Step S7, the calibrator 62 calculates a pulse height that gives the maximum counting rate in the correlated spectrum, and maps the calculated pulse height to the fluorescent X-ray energy from the scintillator. As long as the linearity in the detection outputs from the detecting elements such as the first detecting element 11 and the second detecting element 12 ensured, energy calibration can be performed using energy calibration data represented as a line connecting the zero level E0 of the detector output (the point of origin of the energy) and the pulse height giving the maximum counting rate in the correlated spectrum (Pf/Ef in the example of FIG. 8), as explained with reference to FIGS. 7 and 8.

Alternatively, at Step S8, the energy calibration may be performed using a relation with respect to an energy position calculated with any other method, such as the point of origin of the pulse height, a characterizing X-ray energy position, the position of the edge of the X-ray spectrum (see FIG. 7) calculated in the manner disclosed in Japanese Patent Application Laid-open No. 2014-161590 mentioned above. The calibrator 62 may also perform an operation of the energy resolution of the detector 22 based on the fluorescent X-ray energy width. In this manner, the process illustrated in the flowchart in FIG. 14 is completed. The resolution is a precision at which two different radioactive rays with similar energy levels can be observed as separate.

Detailed Energy Calibration Operation

An exemplary energy calibration operation performed at Step S8 will now be explained. The calibrator 62 in the data processing apparatus 32 obtains the tube voltage (accelerating voltage) "E1" of the X-ray tube 21, which corresponds to the upper boundary of the energy, the zero level (point of origin) "E0" of the detector output, and the pulse height "Pf/Ef" giving the maximum counting rate in the correlated spectrum that is the characterizing X-ray energy position, as illustrated in FIG. 8. The calibrator 62 then generates energy calibration data from these three points using the regression analysis or the least-squares method, for example, and performs the energy calibration. Because the position acquired from the fluorescent X-ray energy detections can be used as the estimated energy upper boundary position E1, where the estimation error is relatively large, highly precise energy calibration can be achieved.

Effects of First Embodiment

As may be clear from the explanation above, the photon counting CT device according to the first embodiment measures radioactive energies that are detected simultaneously at adjacent detecting elements, and acquires the profile of fluorescent X-rays generated inside of the detector. Because fluorescent X-rays are monochromatic energies, the radioactive energy positions can be acquired accurately, without being affected by the energy resolution of the detector 22. Furthermore, the photon counting CT also enables the energy resolution of the detector 22 to be estimated. Furthermore, because events are evaluated in a limited length of time, e.g., by setting the correlated time to τ and the uncorrelated time to 3τ as described above, and every event in the entire time is not evaluated, energy calibration can be completed in short time.

Furthermore, energy calibration can be performed without using any subject specialized for calibration, e.g., a standard source. Therefore, data used in calibration can be acquired while the photon counting CT device is in use (while capturing an image). Furthermore, the temperature characteristic of the detector 22 can be corrected easily.

Second Embodiment

A photon counting CT device according to a second embodiment will now be explained. The photon counting CT device according to the second embodiment calculates a weighting coefficient that is dependent on the detection time difference between the adjacent detecting elements, using a time correlated spectrum, and creates a pulse height histogram by weighting the pulse heights with the respective calculated weighting coefficients. In this manner, creations of a correlated+uncorrelated histogram and an uncorrelated histogram are rendered unnecessary. Hereinafter, only those differences will be explained, and redundant explanations are omitted.

Figure 15:
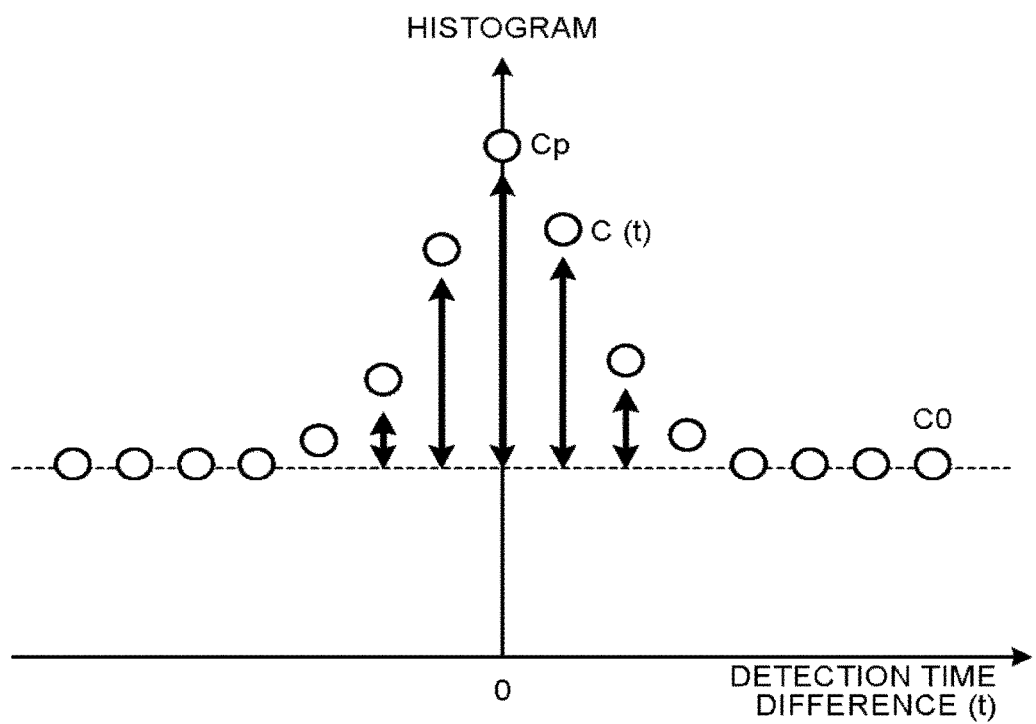
FIG. 15 is a schematic for explaining an operation of creating a weighted detection time difference histogram, weighted by a weight that is dependent on the detection time difference between the adjacent detecting elements, in the photon counting CT device according to a second embodiment.

In other words, the time-correlated histogram has a detection time difference, as illustrated in FIG. 15. The time-correlated histogram also has an offset. The CPU 50 in the photon counting CT device according to the second embodiment calculates a weighting coefficient (Wt) that is based on the detection time difference between the adjacent detecting elements, by functioning as a calculator that performs the operation of Equation (2) below. The CPU 50 also weights the corresponding pulse height by functioning as a processor. In Equation (2) below, "Cp" represents the maximum pulse height (peak count). "C0" represents a count offset. "C(t)" represents the pulse height at time t.

$$W(t)=(C(t)-C0)/(Cp-C0) \qquad (2)$$

Specifically, denoting the pulse height from the first detecting element 11 as p1, the pulse height from the second detecting element 12 as p2, and the detection time difference between detections of these two pulse heights as t0, the CPU 50 adds a weight W(t0) corresponding to the time difference t0 to the time-correlated histograms H1 and H2, (H1(p1)+W(t0), H2(p2)+W(t0)), based on the result in the time-correlated spectrum.

In this manner, a pulse height histogram, in which the pulse heights are reflected with the weighting coefficients corresponding to the respective detection time differences between the adjacent detecting elements, can be created. Therefore, creations of the correlated+uncorrelated histogram and the uncorrelated histogram are rendered unnecessary, as well as the same effects that can be achieved by the first embodiment can be achieved.

In the embodiments described above, the detector is explained to be an indirect conversion detector that uses a scintillator, as an example. However, a direct conversion detector may also be used as the detector, instead of the indirect conversion detector. For example, a semiconductor detector using cadmium telluride semiconductor (CdTe, CdZnTe) may be used. With such a detector, the detector will be handling fluorescent X-ray energies at 23.17 kilo-electron volts (Kα) and at 22.98 kilo-electron volts (Kβ) from the cadmium (Cd).

Furthermore, in the explanation of the embodiments, the correlation between the adjacent first detecting element 11 and the second detecting element 12 is evaluated. It is also possible to evaluate the correlation between detecting elements that are separated by one or more detecting elements (to evaluate the correlation between nearby detecting elements).

The functions of the detector 22, the reader 23, the trigger generator 24, the analyzer 25, the data storage 26, the reader 27, the trigger generator 28, the analyzer 29, the data storage 30, the timing monitor 13, and the data processing apparatus 32 may be implemented as software. For example, the functions of the first detector, the second detector, the generator, and the calibrator may be implemented by causing a computer to execute an input-output calibration program specifying the steps of the process that is explained above to be performed by the first detector, the second detector, the generator, and the calibrator. The input-output calibration program is stored in a hard disk or a semiconductor memory device, for example, and read and executed by a processor such as a CPU or a micro-processor (MPU). The input-output calibration program may also be recorded in a computer-readable recording medium, which may be provided as a computer program product such as a compact disc read-only memory (CD-ROM), a magneto-optical disk (MO), or a digital versatile disc (DVD).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A radiation detecting apparatus comprising:
   detection circuitry configured to
     detect first radiation at a first frequency within a first time by at least a first radiation detecting element and a second radiation detecting element that are positioned near to each other, and output a first signal,
     detect second radiation at a second frequency less than the first frequency within a second time by at least the first radiation detecting element and the second radiation detecting element, and output a second signal,
   control circuitry configured to generate a third signal representing a difference between the first signal and the second signal, and calculate energy using the third signal,
     set a correlation detection time with a given time length at timing at which the first radiation is detected, and to detect the first radiation within a time in which the correlation detection time overlaps with another correlation detection time, as the first time, and
     set an uncorrelation detection time with a given time length at timing at which the first time expires, and detect the second radiation within a time in which the set uncorrelation detection time overlaps with the first time, as the second time.

2. The apparatus according to claim 1, wherein
   the first signal is a radiation detection signal including a correlated time component and an uncorrelated time component,
   the second signal is a radiation detection signal including an uncorrelated time component, and
   the third signal is a radiation detection signal including a correlated time component that is a difference between the first signal and the second signal.

3. The apparatus according to claim 2, wherein the control circuitry is configured to multiply the second signal having the uncorrelated time component by a coefficient in a value capable of being normalized by the first time and the second time, and generate the third signal having the correlated time component that is the difference between the second signal having the uncorrelated time component and the first signal including both the correlated time component and the uncorrelated time component.

4. The apparatus according to claim 1, wherein the control circuitry is configured to perform input-output energy calibration of a radiation detector including the radiation detecting elements using energy calibration data corresponding to a line segment connecting an energy position of a voltage applied by a radiation source, the energy position being set as an upper boundary, to an energy position of the first signal with zero detection time difference between the first radiation from the first radiation detecting element and the first radiation from the second radiation detecting element.

* * * * *